(12) United States Patent
Blackwell (10) Patent No.: US 10,813,268 B2
(45) Date of Patent: Oct. 27, 2020

(54) WING FLEX APPARATUS FOR AGRICULTURAL PLANTER

(71) Applicant: Kinze Manufacturing, Inc., Williamsburg, IA (US)

(72) Inventor: Robert Blackwell, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 294 days.

(21) Appl. No.: 15/942,002

(22) Filed: Mar. 30, 2018

(65) Prior Publication Data
US 2018/0220576 A1 Aug. 9, 2018

Related U.S. Application Data

(63) Continuation of application No. PCT/US2016/054797, filed on Sep. 30, 2016.

(60) Provisional application No. 62/235,624, filed on Oct. 1, 2015.

(51) Int. Cl.
*A01B 73/04* (2006.01)
*A01C 7/20* (2006.01)
*A01B 73/06* (2006.01)
*F16C 11/12* (2006.01)

(52) U.S. Cl.
CPC .......... *A01B 73/044* (2013.01); *A01B 73/065* (2013.01); *A01C 7/208* (2013.01); *F16C 11/12* (2013.01)

(58) Field of Classification Search
CPC ..... A01B 73/044; A01B 73/065; A01C 7/208; F16C 11/12
See application file for complete search history.

(56) References Cited

U.S. PATENT DOCUMENTS 4,058,170 A * 11/1977 Ankenman ............ A01B 61/00
172/311
4,074,766 A * 2/1978 Orthman ................ A01B 73/04
172/311

(Continued)

OTHER PUBLICATIONS

"The International Search Report and Written Opinion of the International Searching Authority" in connection to PCT/US2016/054797 filed Sep. 30, 2016 dated Apr. 12, 2018.

*Primary Examiner* — Jessica H Lutz
(74) *Attorney, Agent, or Firm* — McKee, Voorhees & Sease, PLC (57) ABSTRACT

A system and apparatus for attaching ground engaging tools proximate to the pivot point of an agricultural implement is provided. The system includes a flex apparatus configured to be operatively attached proximate to the pivot point of an agricultural implement by a pin. The flex apparatus may be configured to rotate as the pivot point of the agricultural implement flexes. The flex apparatus may include tracks, slots, or the like, configured to dampen the rotation of the flex apparatus relative to the flex of the pivot point of the agricultural implement. The size, location and orientation of the tracks, slots, or the like, may be configured to provide varying amounts of rotation of the flex apparatus relative to the flex of the pivot point of the agricultural implement. Furthermore, the flex apparatus includes holes, slots, grooves, or the like, configured for attaching a ground engaging tool to the flex apparatus.

20 Claims, 9 Drawing Sheets

(56) References Cited

U.S. PATENT DOCUMENTS

| | | | | |
|---|---|---|---|---|
| 4,342,367 A * | 8/1982 | Gates | A01B 73/04 | 172/311 |
| 4,530,405 A * | 7/1985 | White | A01B 69/024 | 172/126 |
| 4,658,911 A * | 4/1987 | Drever | A01B 73/044 | 172/311 |
| 4,664,202 A | 5/1987 | Applequist et al. | | |
| 4,790,389 A * | 12/1988 | Adee | A01B 35/30 | 172/311 |
| 4,878,545 A * | 11/1989 | Dyken | A01B 73/04 | 172/776 |
| 5,957,216 A * | 9/1999 | Redekop | A01B 69/024 | 172/126 |
| 5,992,534 A * | 11/1999 | Callies | A01B 69/024 | 172/126 |
| 6,082,467 A * | 7/2000 | Friesen | A01B 73/065 | 111/57 |
| 6,119,963 A * | 9/2000 | Bastin | A01M 7/0078 | 239/168 |
| 6,213,219 B1 * | 4/2001 | Mosdal | A01B 73/044 | 172/311 |
| 6,257,343 B1 * | 7/2001 | Maenle | A01B 69/024 | 172/126 |
| 6,293,353 B1 * | 9/2001 | Poole | A01B 59/00 | 16/366 |
| 8,016,043 B2 * | 9/2011 | Naylor | A01B 69/024 | 172/126 |
| 8,468,655 B2 * | 6/2013 | Borkgren | A01B 73/046 | 16/348 |
| 9,763,376 B2 * | 9/2017 | Blackwell | A01C 7/08 | |
| 9,801,343 B2 * | 10/2017 | Markt | A01D 41/14 | |
| 10,051,773 B2 * | 8/2018 | Kovach | A01B 21/083 | |
| 2011/0131762 A1 * | 6/2011 | Palen | A01B 73/046 | 16/357 |
| 2014/0034341 A1 * | 2/2014 | Fast | A01B 73/067 | 172/311 |
| 2020/0053951 A1 * | 2/2020 | Becker | A01B 73/044 | |

\* cited by examiner

WING FLEX APPARATUS FOR AGRICULTURAL PLANTER

CROSS-REFERENCE TO RELATED APPLICATIONS

This application is a continuation of PCT/US2016/054797, filed Sep. 30, 2016, which claims priority under 35 U.S.C. § 119 to Provisional Application Ser. No. 62/235,624, filed Oct. 1, 2015, herein incorporated by reference in their entirety.

FIELD OF THE INVENTION

The invention relates generally to a forward folding agricultural implement. More specifically, but not exclusively, the invention relates to a forward folding agricultural implement frame. Even more specifically, but not exclusively, the invention relates to the mounting of a ground engaging tool proximate to a flex point of an agricultural implement frame.

BACKGROUND OF THE INVENTION

As the power of tractors and agricultural efficiency has increased, agricultural implements, such as planters have increased in span, or width, to accommodate larger numbers of individual row units. Large planters generally include a main frame having a forward hitch assembly for drawing by a tractor and left and right wing sections pivotally attached to a portion of the main frame. The pivoting wing connections allow the wings to fold relative to the main frame for transport and storage of the planter. Early planters pivotally displaced the wings vertically to reduce planter width and to provide clearance for transport through narrow spaces. However, as the size of planters has increased, planter wings are generally folded in a forward direction to accommodate longer planter wings or wing sections. This has required the incorporation of telescoping hitch assemblies and specific folding functions to accommodate planter wings of increased length.

The folding functions of such planters have, to varying degrees, operating limitations due to their design and the environment in which they operate. For example, a forward folding agricultural planter is capable of great operating widths. The increased operating widths may be achieved by lengthening the center toolbar and/or the wing sections of the agricultural planter. Longer wing sections generally require one or more pivot points along the wing that provide angular rotation of a first wing section relative to an adjacent wing section. Traditionally, the center toolbar and the wing sections of an agricultural planter or similar agricultural implement have been comprised of a square or rectangular frame member, and the ground engaging tools or row units have been attached to the center toolbar and wing sections via a U-bolt that encircles the frame member. Row units and ground engaging tools are generally attached or mounted to the frame member of the planter or agricultural implement at predetermined locations based on a desired gap or spacing between adjacent row unit or ground engaging tool. Agronomics, or other climate and/or growing conditions, may dictate the gap between row units on a planter. For example, row units may be attached to provide a fifteen (15") inch gap, or alternatively may be attached to provide a thirty (30") inch gap between adjacent row units. When a narrower gap between adjacent row units or ground engaging tools is desired, adjacent row units or ground engaging tools may be attached proximate to a hinge connecting the center toolbar to the wing, or at pivot point along the wing. Typically, a row unit or ground engaging tool would be mounted or attached on each side of the hinge or pivot location of the wing to achieve a narrow gap. However, when the adjacent row units that are attached directly to the frame of a first and second wing section, on opposing sides of the hinge or pivot point, the deflection of the hinge may cause the row unit attached to the first section to come into contact with the adjacent row unit attached to the second wing section.

Therefore, there exists a need in the art for a means of attaching a row unit or ground engaging tool proximate to a hinge or pivot point of an agricultural implement that overcomes the deficiencies in the art.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide an agricultural implement with ground engaging tools.

It is yet another object, feature, and/or advantage of the invention to provide an apparatus and system to assist with mounting ground engaging tools on an agricultural implement with at least one folding wing.

It is a further object, feature, and/or advantage of the invention to provide an apparatus and system to assist with spacing of the ground engaging tools mounted on the agricultural implement with at least one folding wing.

It is still a further object, feature, and/or advantage of the invention to provide an apparatus and system that allows a ground engaging tool to be mounted on the agricultural implement proximate to the hinge or pivot point.

It is still yet a further object, feature, and/or advantage of the invention to provide an apparatus and system that dampens the angular rotation of a ground engaging tool attached proximate to the hinge or pivot point of an agricultural implement.

Accordingly, one aspect of the invention includes an agricultural implement known as a forward folding agricultural planter. The planter may be connected to a tow tractor and include a transport configuration and a field use configuration. The planter includes, at least in part, a tongue for connection to a tow vehicle. The planter may also include a main toolbar attached to the tongue away from the tow vehicle, as well as one or more wings pivotally coupled to the main toolbar. The wings may pivot about a generally vertical axis relative to the main toolbar. The main toolbar pivot allows the wings to be folded in a generally forward direction when converting the planter from the field configuration to the transport configuration. The wings may include one or more sections, for example, a wing may include an inner section and an outer section. The inner and outer sections of the wing may be pivotally coupled such that the outer section may pivot about a generally horizontal axis relative to the inner section.

Furthermore, the planter may also include a plurality of ground engaging tools, also known as row units. The row units may be attached to the main toolbar and/or the wings. Additionally, the row units are typically positioned adjacent to one another and evenly spaced along the main toolbar and/or wings depending on the agricultural operation being performed.

However, the present invention further includes an apparatus and system for mounting ground engaging tool or row unit proximate to a hinge or pivot point of an agricultural implement. The wing flex apparatus includes slots or tracks for dampening the angular rotation of the row unit or ground engaging tool attached to the wing flex system. The wing flex apparatus may be attached proximate to a hinge or pivot point connecting a center toolbar to a wing or an inner wing section to an outer wing section. A row unit or ground engaging tool may be attached to the wing flex apparatus. As the hinge or pivot point is deflected, the wing flex apparatus may reduce the angular rotation of the attached row unit or ground engaging tool relative to the angular rotation of an adjacent row unit or ground engaging tool attached to the wing or outer wing section.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

An apparatus and system for mounting a ground engaging tool on an agricultural implement proximate to the location of a pivot joint is disclosed. An agricultural implement may be used to plant seed, apply fertilizer, work ground, etc. For example, an agricultural implement referred to as a plow may be used for turning over the soil, an agricultural planter may be used to plant the seed, and an applicator may be used to apply chemicals. Generally, agricultural implements comprise various types of ground engaging tools that are configured based on the agricultural operation to be performed. For example, a plow may include a cutting disk, plow shank, or tines that are attached to a main toolbar and/or wing(s) for loosening and turning over the soil. A planter may include an assembly known as a row unit, the row unit generally configured to insert a seed into the soil. Depending on the type of seed being planted and other conditions, such as the soil type or expected climate/growing conditions, the row units may be spaced apart at any distance along the toolbar and/or wings of the planter to provide the preferred or optimal gap between rows. For example, when planting corn, a gap of thirty (30") inches between adjacent rows may be desired. Alternatively, when planting soybeans, a gap of fifteen (15") inches between adjacent rows may be desired. As the size and length of agricultural implements have increased, hinges and pivot points have been incorporated to allow for the folding of wings to convert from a field use to a transport configuration, and vice versa. Hinges and pivot points may also been included along the length of the toolbar and/or wings to allow the toolbar and/or wing(s) to flex or bend as the agricultural implement travels over an uneven surface when in the field use configuration. For example, the wings of the implements extending outwardly in a direction generally transverse a tongue may include sections or portions that are movable relative to one another, such that the ground-engaging tools along the length of the wings remain in contact with the ground, regardless of the changing landscape and elevation along the lengths of the same toolbars.

As will be understood, a flex apparatus 30 for mounting ground engaging tools, such as a row unit 28, proximate to a hinge or pivot point 26 of an agricultural implement includes at least a front plate 34 that comprises a plurality of slots or tracks 40. The flex apparatus 30 may also include one or more bushings 38 that travel within the slots or track 38 as the flex apparatus 30 rotates. The flex apparatus may be operatively attached to the toolbar of an agricultural implement, such as a planter 10, by a pin 36. The apparatus 30 allows for the wing sections of the planter to pivot relative one another, while restricting, at least partially, the amount of angular pivoting of the row unit attached thereto and/or thereat. The flex apparatus 30, according to some aspects of the invention, can limit the side pivoting/rotation of the row unit by approximately half as much as the wing will undergo, which prevents adjacent row units from contacting each other.

Figure 1:
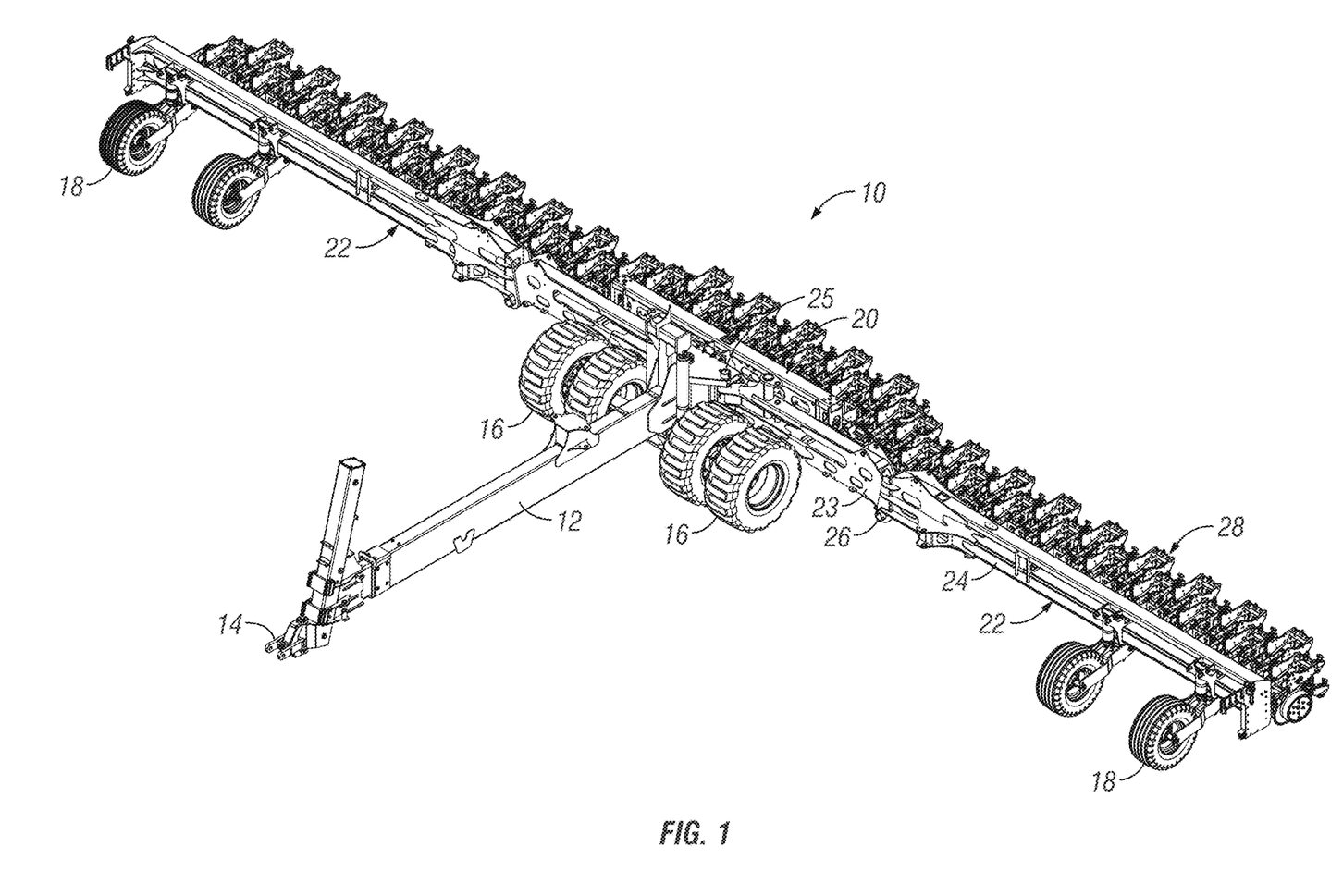
FIG. 1 is a perspective view of a forward folding agricultural implement.
Figure 2:
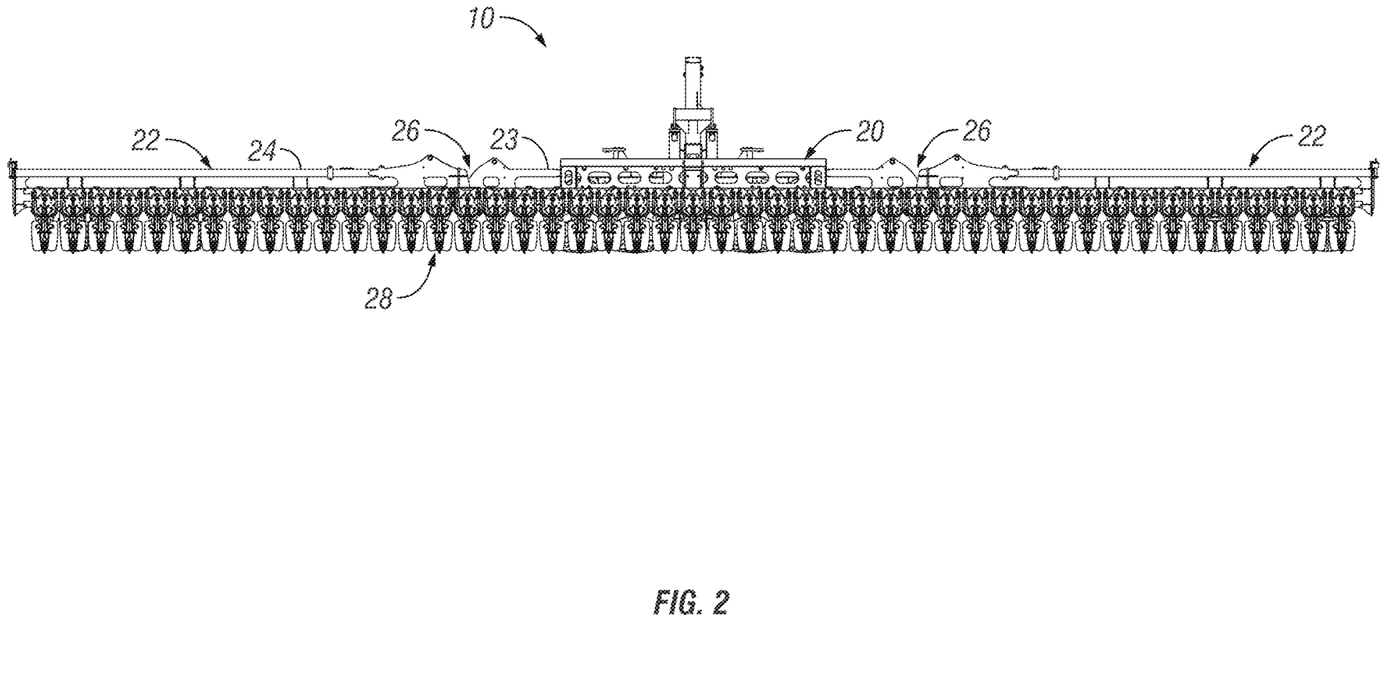
FIG. 2 is a rear view of the forward folding agricultural implement of FIG. 1.

Referring to FIGS. 1 and 2, an agricultural planter 10 is shown. The planter 10 may include a tongue 12 that extends longitudinally from a main or center toolbar 20. The tongue 12 typically includes a hitch 14 opposite the center toolbar 20, with the hitch 14 configured to attach the planter 10 to a tow vehicle, such as an agricultural tractor. The tongue 12 may be configured to extend telescopically. A telescoping tongue 12 may include a hollow rectangular member disposed about a smaller rectangular member, the smaller rectangular member configured to slide within the larger hollow rectangular member to lengthen or shorten the tongue 12. It should also be appreciated that the telescoping tongue 12 may include additional members or sections as well, depending on the length needed. The additional tongue sections can be hollow and received within one another to allow the length of the tongue 12 to vary.

The center toolbar 20 is generally perpendicular to the tongue 12. The center toolbar 20 may be supported by ground engaging wheels 16 that may include one or more hydraulic cylinders that may be used to raise and lower the center toolbar 20. The center wheels 16 may be used to raise the center toolbar 20 when the planter 10 is required to make a turn, or the center wheels 16 may also support the entire planter 10 when in a transport configuration. As shown in FIGS. 1-2, a pair of wings 22 are pivotally attached to each end of the center toolbar 20 by a hinge 25. The hinge may be configured to pivot the wing(s) 22 about a generally vertical axis when utilized for folding the wing(s) 22 in forward direction to convert from a field use configuration to a transport configuration, and vice versa. Alternatively, the hinge 25 may also be configured to pivot the wing(s) 22 about a generally horizontal axis to provide angular rotation of the wing(s) 22 relative to the center toolbar 20 when traveling over an uneven surface in a field use configuration.

It should be understood that an agricultural implement, such as a planter 10, may include one or more wings 22, but wings 22 are not required. Each wing 22 may include one or more wing wheels 18 for supporting and lifting or lowering the wing 22. For example, the wing wheels 18 may aid with depth control of the row unit 28 by setting the distance between the wing frame 22 and the ground. The wing wheels 18 may also be used to raise the wing 22 when the planter 10 is required to make a turn.

In a field use configuration, as shown in FIGS. 1-2, the wings 22 are generally perpendicular to the tongue 12. Alternatively, when the planter 10 is in a transport configuration, the wings 22 may be folded such that they are generally parallel to the tongue 12. As the wings 22 transition from the field use configuration to the transport configuration, the tongue 12 may telescope to provide sufficient distance between the tractor that is towing the planter 10 and the center toolbar 20 for the wings 22 to fold forward. When converting from a transport configuration to a field use configuration, and vice versa, the wings 22 may be pivoted about a generally vertical axis created by a hinge.

The wings 22 may also include a pivot 26, which separates the wing into multiple sections, such as inner and outer wing sections. The pivot 26 allows the wing 22 to flex or rotate about a generally horizontal axis. For example, a hinge or pin may be utilized to provide the rotation movement of an inner section of the wing 23 relative to an outer section of the wing 24. The pivot 26 may be configured to allow the outer section of wing 24 to rotate or flex relative to the inner section of the wing 23. For example, the wing 22 may flex at the pivot 26 to ensure that the row units 28 attached along the wing 22 maintain contact with the ground as the planter 10 travels over an uneven surface. It should be understood that a wing 22 may include one or more pivot points 26 along the length of the wing 22, or no pivots at all. The number of pivots 26 included along a wing 22 typically will depend on the length of the wing 22, among other factors. For example, a longer wing 22 may require additional pivots 26 in order to allow for the appropriate flex in the wing 22 to ensure all of the row units 28 attached to the wing 22 remain in contact with the ground. However, if a wing 22 is shorter, no pivots 26 may be required. Thus, the inner wing section may be elevated upward from the central toolbar, while the outer section can be pivoted in a downward manner to make sure that the tools at the outer wing section remain in contact with the ground.

Shown in FIG. 1 are a plurality of row units 28 mounted to the center toolbar 20 and the wings 22 of a planter 10. The row units 28 are attached in an adjacent manner to the rear of the toolbar 20 and wings 22, away from the hitch 14. The number of row units 28 mounted along the toolbar 20 and/or the wings 22 may be based on the length of the planter 10, as determined by the overall length of the toolbar 20 and wings 22. It may also depend on the type of seed being planted and/or the desired spacing between rows of planted seed. For example, it is contemplated that a shorter length planter 10 will likely have fewer row units 28 than a longer planter 10. Additionally, the desired gap between adjacent row units 28 may determine the number of row units 28 attached to the toolbar 20 and/or wings 22. The gap between the row units 28 may be configured based on the type of seed being planted. For example, if the row units 28 are configured to plant corn seed, there may be a twenty (20") inch gap or even a thirty (30") inch gap between adjacent row units 28. The gap between row units 28 is typically the distance measured between the location where a row unit 28 inserts a seed into the ground and the location where an adjacent row unit 28 inserts a seed into the ground. An example of a row unit for use with the present invention is found in U.S. application Ser. No. 13/829,726, which is hereby incorporated in its entirety. However, any type of row unit 28 could be used with the invention. The agricultural implement is not limited to a planter with row units, but instead could be adapted for use with any agricultural implement having ground engaging tools such as seed drills, cultivators, fertilizer and pesticide applicators, and the like.

Furthermore, a rail assembly may be utilized for attaching or mounting one or more row units 28 to the frame of the center toolbar 20 and/or wing(s) 22 of a planter 10 at predefined gap intervals. The rail assembly may be configured to be attached or mounted to the frame of the planter 10 and include holes, slots, grooves, or the like, for operatively attaching one or more row units 28 to the rail assembly. The holes, slots, grooves, and the like may be configured to attach one or more row units 28 at any point along the toolbar 20 and/or wing(s) 22, irrespective of the location of braces or other support structures included along the frame. The rail assembly may be configured to allow the user to switch between various predefined gap spacings by attaching row units 28 to the holes, slots, grooves, or the like, that correspond to the desired gap. For example, if the row units 28 are configured to plant corn seed, a twenty (20") inch gap or even a thirty (30") inch gap between adjacent row units 28 may be desired. Alternatively, if the row units 28 are configured to plant soybeans, a fifteen (15") inch gap may be desired, and a user may switch from a thirty (30") inch gap to a fifteen (15") inch gap by moving the row units 28 to the corresponding holes, slots, grooves, or the like. The gap between row units 28 is typically the distance measured between the location where a row unit 28 inserts a seed into the ground and the location where an adjacent row unit 28 inserts a seed into the ground. It is contemplated that the rail assembly may be configured to provide any desired gap distance between adjacent row units 28, as well as that row units 28 may be attached at any point along the planter 10. It is further contemplated that one or more rail assemblies may be utilized to attach row units 28, as well as other ground engaging tools, in front of or behind the frame of the center toolbar 20 and/or wing(s) 22. For example, a rail assembly may be attached to the back of the toolbar 20 and/or wing 22 for attaching row units 28 and an additional rail assembly may be attached to the front of the toolbar 20 and/or wing 22 for attaching a coulter, disk, or fertilizer applicator.

Figure 3:
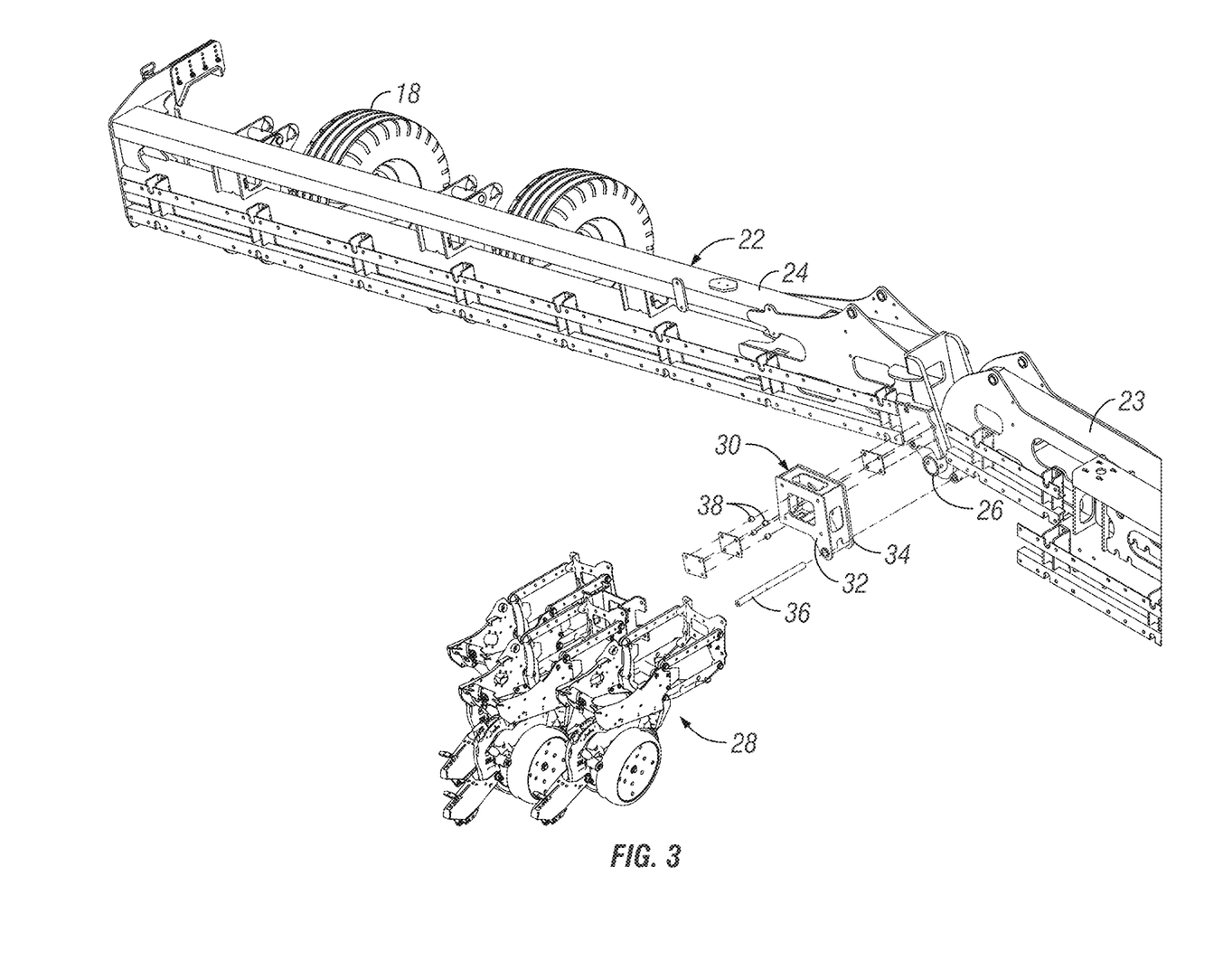
FIG. 3 is an exploded perspective view of a wing flex apparatus for attaching a row unit at the flex point of a wing.

Referring to FIG. 3, an exploded assembly drawing of a wing flex apparatus 30 for attaching a row unit 28 proximate to a pivot point 26 is shown. The wing 22 includes an inner wing section 23 and an outer wing section 24 connected by a pivot point 26. The flex apparatus 30 may be pivotally connected to the inner wing section 23 by a pin 36. It is also contemplated that the wing flex apparatus 30 may be configured to be attached via the pin 36 to the outer section of the wing 24, such that apparatus 30 would mirror the one represented in FIG. 3 about the pivot point 26. Furthermore, it is contemplated that a wing flex apparatus 30 may be attached in front of the wing 22, behind the wing 22, or both in front of and behind the wing 22 to allow for multiple ground engaging tools to be attached proximate to the pivot 26, such as in a push/pull planter configuration.

The pin 36 may be configured to allow the wing flex apparatus 30 to pivot about a generally horizontal axis when the outer wing section 24 rotates relative to the inner wing section 23. For example, as the wing 22 travels over an uneven surface, the outer wing section 24 may rotate about the pivot point 26 relative to the inner wing section 23. One of the many advantages provided by the pivot 26 connection between the inner 23 and outer 24 wing sections is that it allows the outer wing section 24 to rotate relative to the inner wing section 23 in order to allow the attached row units 28 to maintain contact with the ground. The ability of the outer wing section 24 to rotate relative to the inner wing section 23 may also improve the depth control of the row units 28, with regard to the depth the seed is planted at, when the planter 10 travels over an uneven surface. For example, if the wing 22 were a solid frame, when the planter travelled over an uneven surface, there would likely be less downward force on any row units 28 attached along the wing 22 where there was a valley in the surface. It is even possible, that at times, one or more row units 28 attached at a point where the surface includes a valley, that the row unit 28 may lose contact with the ground entirely. The pivot 26 along the wing 22 allows for the outer section of the wing 24 to rotate about the inner section of the wing 24 to accommodate for changes in the terrain. While only one pivot 26 is shown in FIG. 3, it should be understood that depending on the size and/or length of a wing 22, additional pivots 26 may be required. It should be understood that a wing flex apparatus 30 may be utilized at each pivot 26 along the wing 22 for attaching a row unit 28 proximate to said pivot 26.

Figure 4:
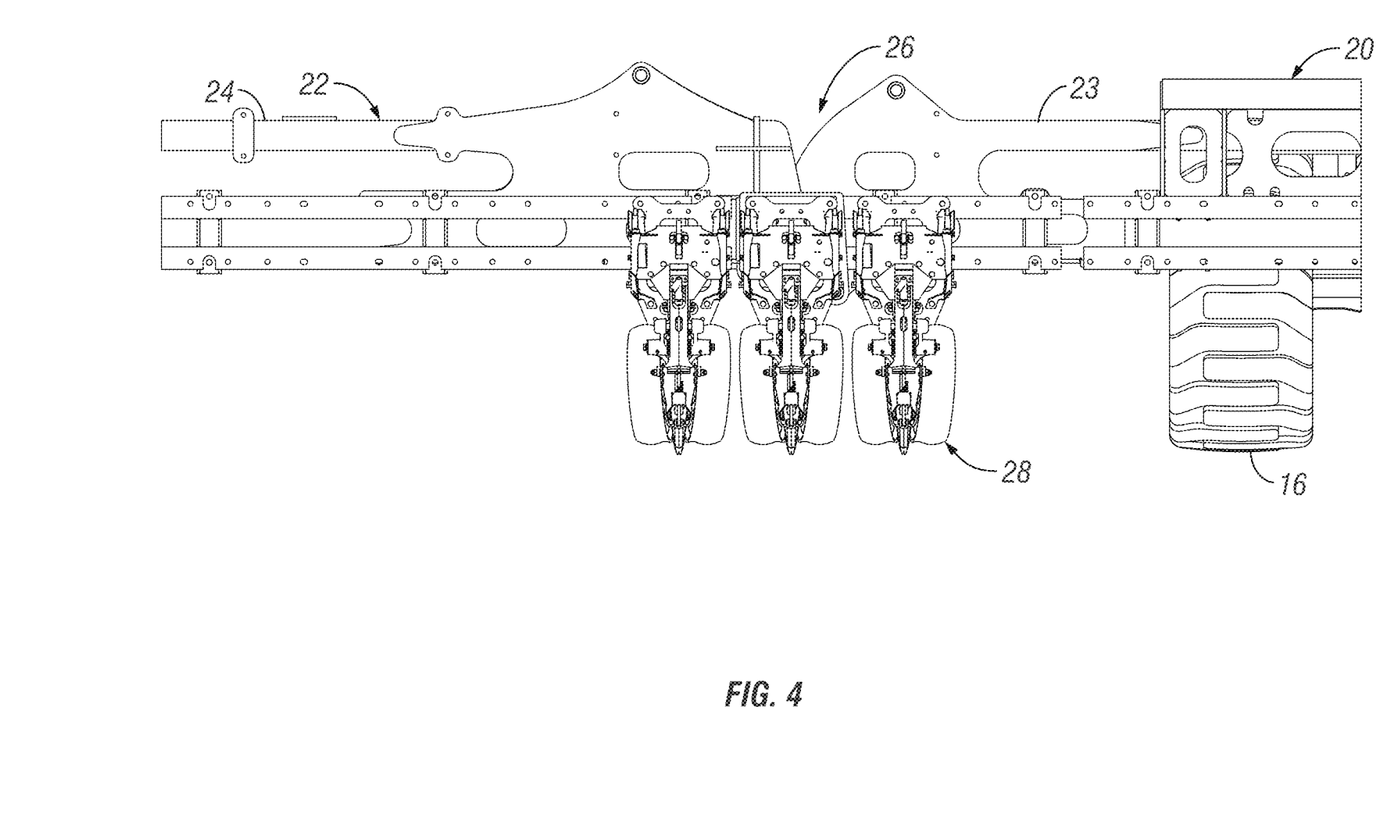
FIG. 4 is a rear view of a wing flex apparatus with a row unit attached, the wing oriented in a neutral flex position.

As shown in FIG. 3, the wing flex apparatus 30 includes a front plate 34 and a rear plate 32. The front plate 34 may include one or more tracks or slots 40 (as shown in FIG. 4). The tracks or slots 40 may include spacers or bushings 38 configured to travel within the tracks or slots 40. One or more pins, bolts, or the like, may operatively attach the wing flex apparatus 30 to the outer section of the wing 24. The pin, bolt, or the like, may be configured to pass through the spacers or bushings 38 and travel within the tracks or slots, which are configured to dampen the rotation of the wing flex apparatus 30. For example, as the outer wing section 24 rotates relative to the inner wing section 23, the pin 36 will allow the wing flex apparatus 30 to rotate and the size, shape, or curvature of the one or more tracks or slots 40 will determine the amount of rotation of the wing flex apparatus 30.

The rear plate 32 may include holes, slots, grooves, or the like, configured for attaching a row unit 28. The holes, slots, grooves, or the like, for attaching one or more row units 28 to the wing flex apparatus 30 may be configured to allow the row unit 28 to be attached to provide a specific gap 40 or spacing between adjacent row units 28. Furthermore, the holes, slots, grooves, and the like, may be configured such that the operator may convert the row units 28 from one predefined gap to another by attaching the row units 28 using a different hole configuration that are included in the rear plate 32. It should be understood that the pattern, location, and/or spacing of the holes, slots, grooves, or the like, may be configured based on the size and dimensions of a particular ground engaging tool or row unit 28. Furthermore, a wing flex apparatus 30 may be configured or adapted to attach a ground engaging tool or row unit 28 from various manufacturers. For example, one particular wing flex apparatus 30 may be configured for attaching row units 28 from manufacturer ABC, whereas another wing flex apparatus 30 may be for attaching row units 28 from manufacturer XYZ. It should also be understood that the configuration of holes, slots, or grooves for attaching one manufacturers row units 28 to provide a fifteen (15") inch gap may be different than the configuration for attaching a second manufacturers row units 28 to get the same thirty (30") inch gap between adjacent row units 28.

Referring to FIGS. 4-9, various example orientations of the wing flex apparatus 30 relative to the wing pivot 26 position are shown. Shown in FIG. 4 is a rear view of wing 22 oriented in a neutral flex position. A row unit 28 is operatively attached to the wing 22 via the wing flex apparatus 30. FIG. 4 includes three row units 28, the middle row unit 28 being attached via the wing flex apparatus 30 proximate to the wing pivot 26, whereas the row units 28 to the left and right of the middle row units 28 will be attached to the outer 24 and inner 23 wing sections respectively.

Figure 5:
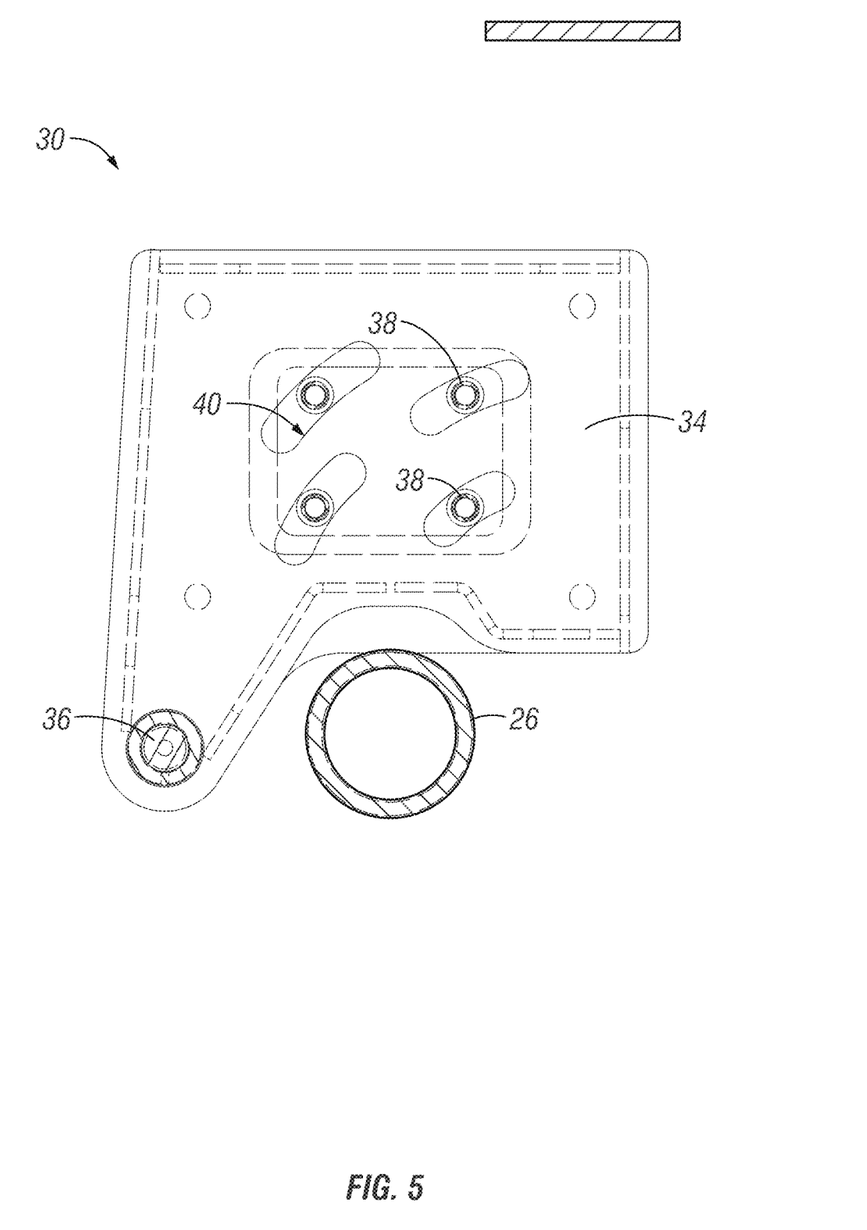
FIG. 5 is a front view of a wing flex apparatus, the wing in a neutral flex position.

Referring to FIG. 5, a front view of a wing flex apparatus with the wing 22 in a neutral flex position is shown. The front plate 34 of the wing flex apparatus 30 may include one or more tracks or slots 40 configured to dampen the angular rotation of the apparatus. When the wing 22 is in a neutral position, the bushings 38 that travel within the tracks or slots 40 will typically be near the center of each specific track or slot 40. Shown in FIG. 5 are four slots 40, but it should be understood that any number of tracks or slots 40 may be included. Additionally, the configuration and or orientation for the slots 40 may be configured to provide varying amounts of angular rotation of the wing flex apparatus 30 relative to the deflection of the wing pivot 26. For example, the slots 40 may be configured to provide one degree of rotation of the wing flex apparatus for every two degrees of flex of the wing pivot 26. The suggested 2:1 ratio of flex at the wing pivot 26 to angular rotation of the wing flex apparatus 30 may provide an increase in the maximum flex allowable at the wing pivot 26. Attaching a row unit 28 proximate to the wing pivot 26 without the wing flex apparatus 30 would likely result in limiting the amount of flex at the pivot 26. For example, if a row unit 28 were attached on each side of the wing pivot 26 utilizing a fifteen (15") inch gap between the row units 28, the wing pivot 26 may be limited to only six or seven degrees of flex before the row unit 28 attached to the outer wing section 24 would come into contact with the row unit 28 attached to the inner wing section 23. Alternatively, by using the wing flex apparatus 30 to dampen the angular rotation of a row unit 28 attached proximate to the pivot 26, using a slot configuration to provide a 2:1 ratio, the wing pivot 26 may flex thirteen to fourteen degrees before the adjacent row units 28 attached proximate to the pivot 26 would come into contact with one another. Additionally an increased amount of flex at the wing pivot 26 may reduce compaction of the soil by more evenly distributing the weight along the wing 22 when traveling over an uneven surface. It should be understood that the tracks or slots 40 may be configured to create any ratio of flex at the wing pivot 26 to the angular rotation of the wing flex apparatus 30 that a user may desire. Furthermore, it is to be appreciated that, while the 2:1 ratio and angular rotation amounts have been provided, these are for exemplary purposes only. The invention contemplates adjustments to make the ratio and angular limitation near infinite, and can be configured to be adjusted based upon type of units, user choice, and the like.

Figure 6:
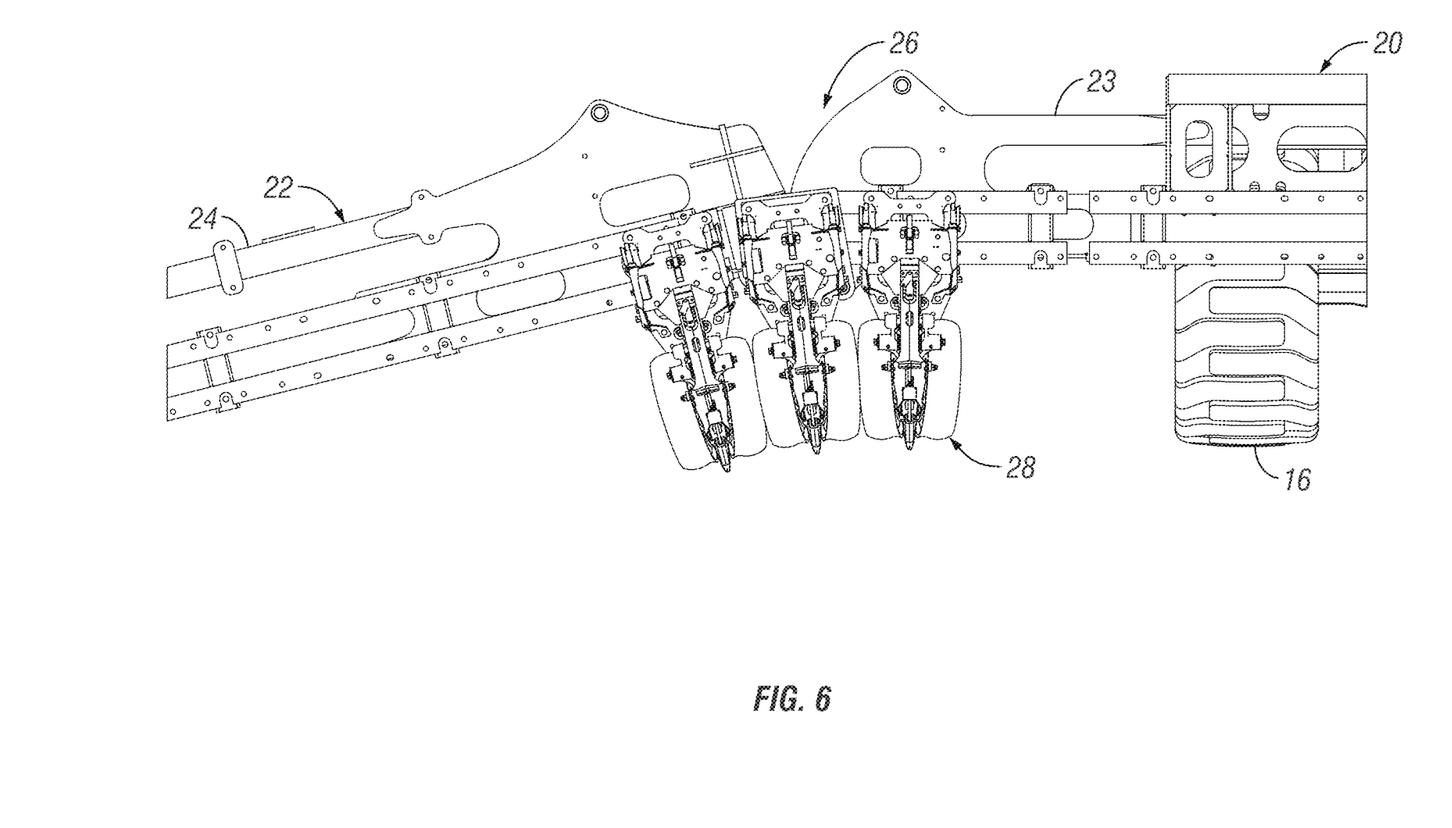
FIG. 6 is a rear view of a wing flex apparatus with a row unit attached, the wing oriented in a downward flex position.

Referring to FIG. 6, a rear view of a wing flex apparatus 30 with a row unit 28 attached is shown. FIG. 6 represents a wing 22 oriented in a downward flex position with the middle row unit 28 attached to the wing flex apparatus 30. For example, this is likely to occur when the outer wing section 24 is travelling over a surface that is lower than the inner wing section 24. To accommodate for the uneven surface of the terrain, the wing pivot 26 will flex, allowing the outer wing section 24 to rotate in a generally downward direction relative to the inner wing section 23.

Figure 7:
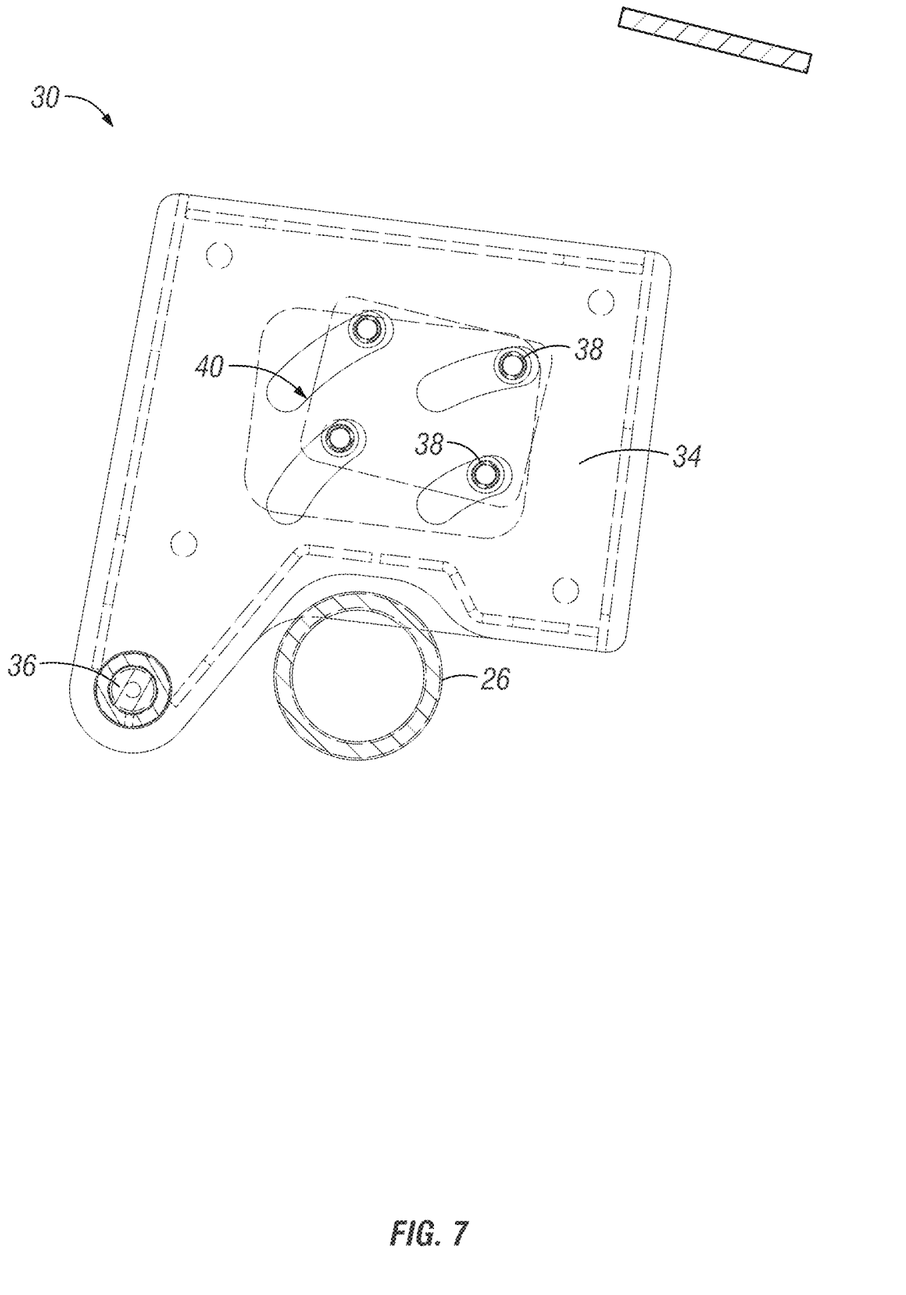
FIG. 7 is a front view of a wing flex apparatus, the wing in downward flex position.

Referring to FIG. 7, a front view of a wing flex apparatus with the wing in a downward flex position is shown. When the wing 22 is in a downward position, the bushings 38 will travel within the tracks or slots 40 as the wing flex apparatus rotates about the pin 36. As shown in FIG. 7, when the wing 22 is in a downward position, the bushings 38 will travel from the center (neutral position) toward the right, as viewed from the front of the wing flex apparatus 30. It should be understood that the tracks or slots 40 may be configured to allow for the bushings to travel in either direction as the wing flex apparatus 30 rotates.

Figure 8:
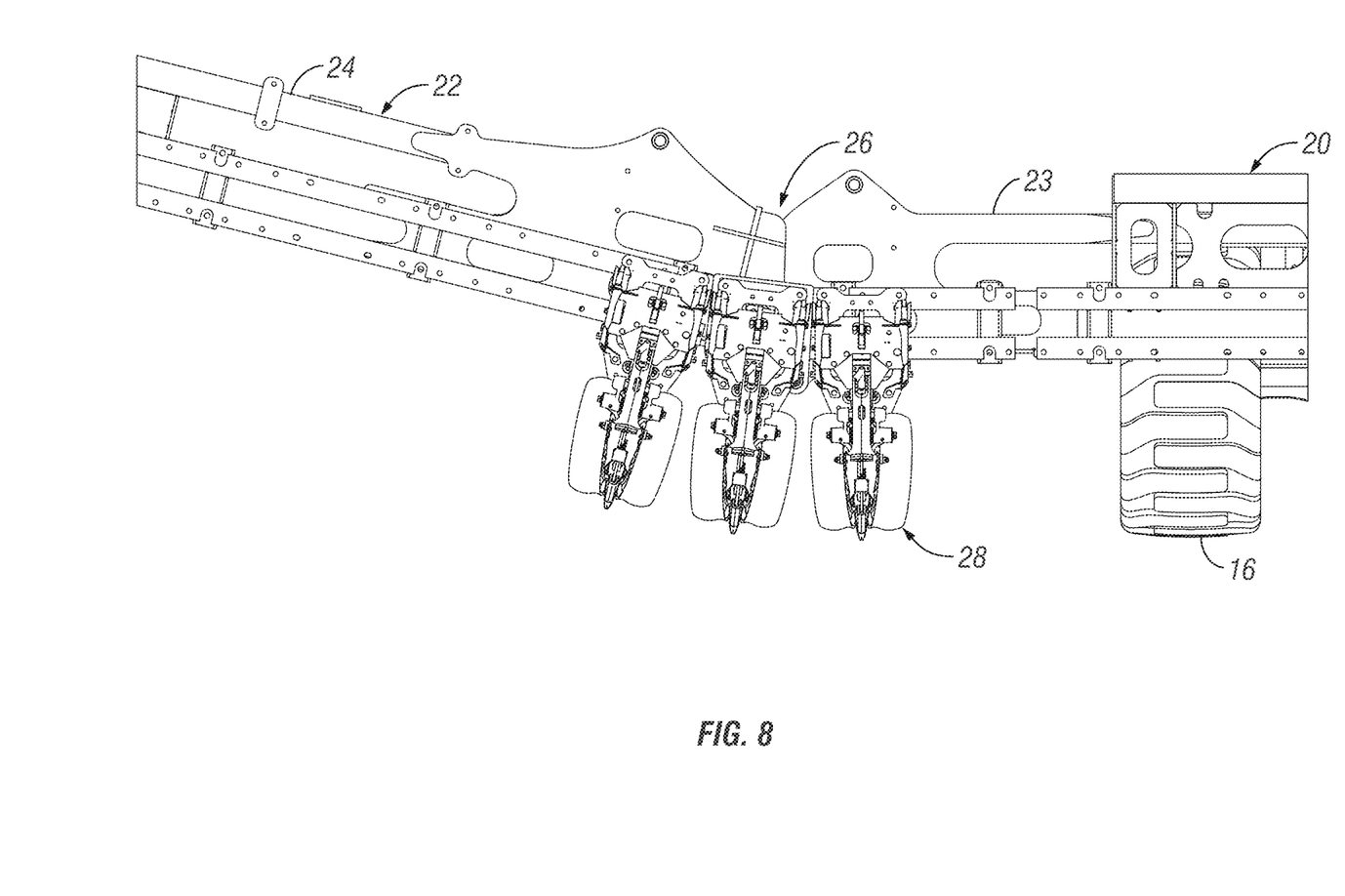
FIG. 8 is a rear view of a wing flex apparatus with a row unit attached, the wing oriented in an upward flex position.

Referring to FIG. 8, a rear view of a wing flex apparatus 30 with a row unit 28 attached is shown. FIG. 8 represents a wing 22 oriented in an upward flex position with the middle row unit 28 attached to the wing flex apparatus 30. For example, this is likely to occur when the outer wing section 24 is travelling over a surface that is higher than the inner wing section 24. To accommodate for the uneven surface of the terrain, the wing pivot 26 will flex, allowing the outer wing section 24 to rotate in a generally upward direction relative to the inner wing section 23.

Figure 9:
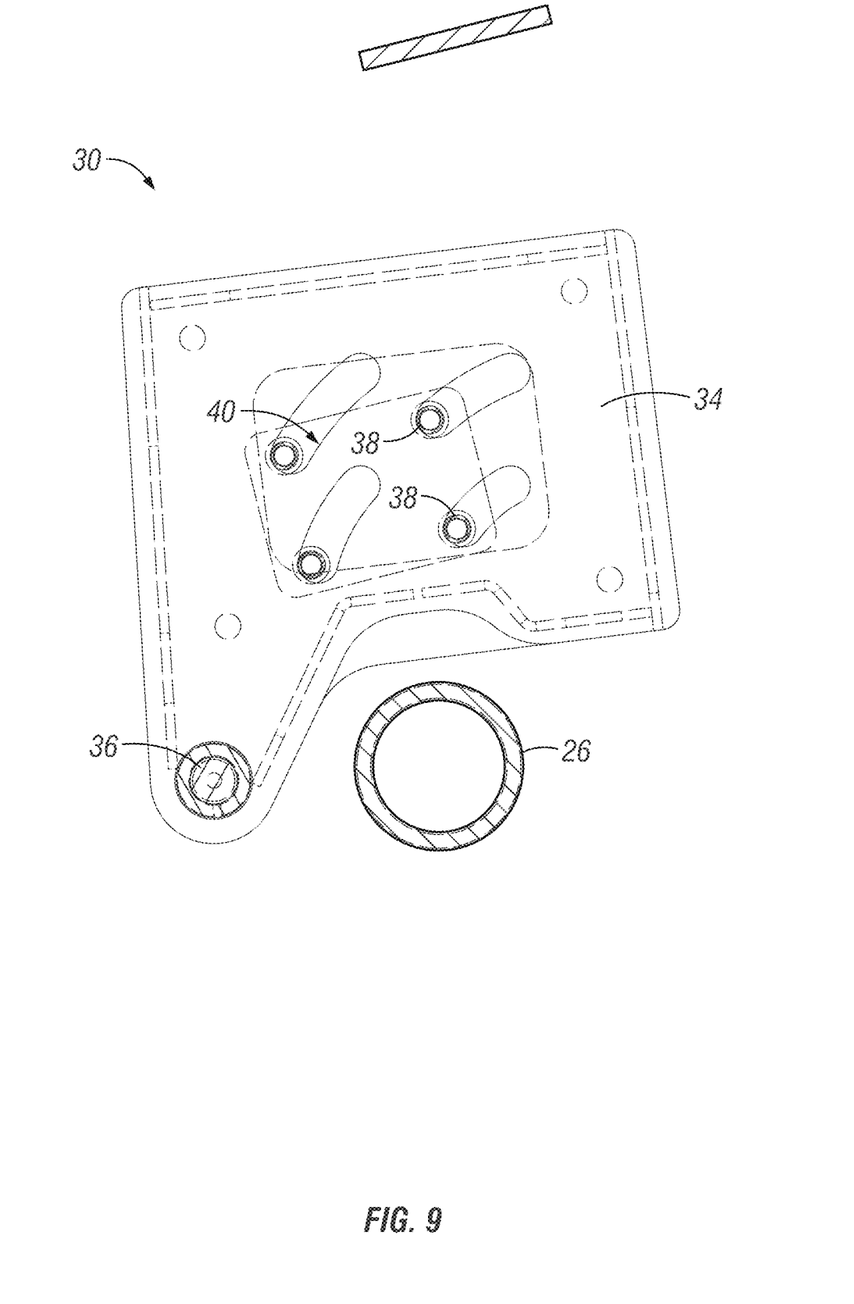
FIG. 9 is a front view of a wing flex apparatus, the wing in an upward flex position.

Referring to FIG. 9, a front view of a wing flex apparatus with the wing in an upward flex position is shown. When the wing 22 is in an upward position, the bushings 38 will travel within the tracks or slots 40 as the wing flex apparatus 30 rotates about the pin 36. As shown in FIG. 7, when the wing 22 is in an upward position, the bushings 38 will travel from the center (neutral position) toward the left, as viewed from the front of the wing flex apparatus 30.

While the figures primarily relate to the use of a wing flex apparatus 30 for attaching a row unit 28 proximate to the pivot point 26 of a planter 10, it should be understood that the wing flex apparatus 30 may be configured for use with other agricultural implements that include folding wings or pivot points. For example, the wing flex apparatus 30 may be configured for use with a plow to attach or mount the diggers, plow shanks, or tines where the wing pivotally attaches to the center toolbar. The wing flex apparatus 30 may also be configured for use with a field cultivator that includes folding wings and/or wing pivot points, whereas the wing flex apparatus 30 may attach a shank proximate to a pivot point.

Furthermore, as indicated, it is contemplated that multiple wing flex apparatuses could be included for use with a planter having multiple wing segments, which would allow for even greater control during transport on and over uneven surfaces. The apparatus could be utilized at each section pivot, or in selected portions.

A wing flex apparatus for attaching a ground engaging tool proximate to a hinge of a wing of an agricultural implement has thus been described. The wing flex apparatus is capable of limiting the angular rotation of an attached ground engaging tool relative to the angular rotation of an outer section of the wing pivoted about an inner section of the wing. The present invention contemplates numerous variations, options and alternatives, and is not to be limited to the specific embodiments described herein. Other changes are considered to be part of the present invention.

What is claimed is:

1. An agricultural planter comprising:
   a tongue comprising a first end and a second end, said first end comprising a hitch;
   a center toolbar attached to the second end of the tongue;
   one or more wings pivotally coupled to the center toolbar, said wings comprising an inner section and an outer section coupled by a hinge configured to pivot the outer section relative to the inner section about a substantially horizontal axis;
   a plurality of row units operatively attached along the center toolbar and the one or more wings, said plurality of row units adjacent to one another;
   a flex apparatus pivotally attached proximate to the hinge of the one or more wings, said flex apparatus attached to one of the plurality of row units; and
   wherein an angular rotation of the row unit attached to the flex apparatus is less than an angular rotation of an adjacent row unit attached to the outer wing section.

2. The agricultural planter of claim 1, wherein the flex apparatus comprises one or more tracks/slots configured to permit the angular rotation of the row unit operatively engaged by the flex apparatus relative to the deflection of the hinge.

3. The agricultural planter of claim 2, wherein the flex apparatus further comprises one or more bushings configured to slide/travel within the one or more tracks/slots.

4. The agricultural planter of claim 1, wherein the flex apparatus is configured to provide a 2:1 ratio of the deflection of the outer wing section relative to angular rotation of the row unit operatively engaged by the flex apparatus, said deflection and said angular rotation measured in degrees.

5. The agricultural planter of claim 1, wherein the agricultural planter is a forward folding planter, said one or more wings configured to pivot about a generally vertical axis proximate to the center toolbar.

6. The agricultural planter of claim 1, wherein the flex apparatus is pivotally attached to the inner section of the wing by a pin.

7. The agricultural planter of claim 6, wherein the flex apparatus further comprises an inner surface and an outer surface.

8. The agricultural planter of claim 7, wherein the inner surface of the flex apparatus is operatively attached to the outer section of the wing by the one or more bushings.

9. The agricultural planter of claim 7, wherein the outer surface of the flex apparatus is operatively attached to one of the plurality of row units.

10. The agricultural planter of claim 7, wherein the pin pivotally attaches the flex apparatus to the inner section of the wing via an aperture through both the inner surface and the outer surface of the flex apparatus.

11. A wing of an agricultural implement comprising:
    an inner section pivotally coupled to an outer section at a pivot;
    a plurality of ground engaging tools operatively mounted to the wing;
    a flex apparatus pivotally attached proximate to the pivot of the wing, said flex apparatus configured to operatively engage one of the plurality of ground engaging tools;
    wherein the flex apparatus more significantly dampens angular rotation for the ground engaging tool operatively engaged by the flex apparatus than for an adjacent ground engaging tool mounted on the outer section of the wing, thereby allowing for an increased amount of flex at the hinge; and
    wherein the degree of angular rotation of the ground engaging tool operatively engaged by the flex apparatus is less than the angular rotation of the adjacent ground engaging tool mounted on the outer section of the wing.

12. The wing of claim 11, wherein the flex apparatus comprises a plurality of slotted tracks configured to permit angular rotation of the flex apparatus relative to the deflection of the pivot.

13. The wing of claim 11, wherein the wing further comprises a plurality of pivots, said plurality of pivots creating a plurality of wing sections.

14. The wing of claim 13, wherein the flex apparatus is pivotally attached at each of the plurality of pivots along the wing.

15. An agricultural implement comprising:
- a telescoping tongue comprising a first end and a second end, said first end comprising a hitch configured to be attached to a tow vehicle;
- a center toolbar attached to the second end of the tongue;
- one or more wings pivotally coupled to the center toolbar by a hinge configured to pivot the one or more wings relative to the center toolbar about a substantially horizontal axis;
- a plurality of ground engaging tools operatively attached along the center toolbar and the one or more wings, said plurality of ground engaging tools adjacent to one another; and
- a flex apparatus pivotally attached proximate to the hinge, said flex apparatus operatively engaging one of the plurality of ground engaging tools attached proximate to the hinge;
- wherein the substantially horizontal axis is substantially parallel to a longitudinal axis traversing the center toolbar;
- wherein, when the agricultural implement rests on level ground, the one or more wings are substantially parallel to the longitudinal axis of the center toolbar; and
- wherein the flex apparatus comprises one or more slotted tracks configured to limit the angular rotation of the ground engaging tool operatively engaged by the flex apparatus, said angular rotation of the ground engaging tool operatively engaged by the flex apparatus is less than the angular rotation of an adjacent ground engaging tool attached to the one or more wings.

16. The agricultural implement of claim 15, wherein the agricultural planter is a forward folding planter, said one or more wings configured to pivot about a generally vertical axis proximate to the center toolbar.

17. The agricultural implement of claim 15, wherein the flex apparatus is configured to provide a 2:1 ratio of the deflection of the hinge relative to the angular rotation of the row unit operatively engaged by the flex apparatus, said deflection and angular rotation measured in degrees.

18. The agricultural implement of claim 15, wherein the one or more wings further comprises a plurality of pivots, said plurality of pivots configured to provide deflection of the wing about a generally horizontal axis.

19. The agricultural implement of claim 18, wherein the flex apparatus is pivotally attached at each of the plurality of pivots along the wing.

20. The agricultural implement of claim 15, wherein the hinge permits concave and convex configurations of the one or more wings.

* * * * *